(12) United States Patent
Cho et al.

(10) Patent No.: US 10,169,468 B2
(45) Date of Patent: Jan. 1, 2019

(54) SECURE MONITORING TECHNIQUE FOR MOVING K-NEAREST QUERIES IN ROAD NETWORK

(71) Applicant: AJOU UNIVERSITY INDUSTRY-ACADEMIC COOPERATION FOUNDATION, Suwon-si, Gyeonggi-do (KR)

(72) Inventors: Hyung Ju Cho, Yongin-si (KR); Tae Sun Chung, Suwon-si (KR); Se Jin Kwon, Suwon-si (KR); Rize Jin, Suwon-si (KR)

(73) Assignee: AJOU UNIVERSITY INDUSTRY—ACADEMIC COOPERATION FOUNDATION, Suwon-Si (KR)

(*) Notice: Subject to any disclaimer, the term of this patent is extended or adjusted under 35 U.S.C. 154(b) by 567 days.

(21) Appl. No.: 14/784,227

(22) PCT Filed: Feb. 13, 2014

(86) PCT No.: PCT/KR2014/001168
§ 371 (c)(1),
(2) Date: Oct. 13, 2015

(87) PCT Pub. No.: WO2014/126390
PCT Pub. Date: Aug. 21, 2014

(65) Prior Publication Data
US 2016/0203226 A1 Jul. 14, 2016

(30) Foreign Application Priority Data
Feb. 13, 2013 (KR) .................. 10-2013-0015276

(51) Int. Cl.
G06F 17/30 (2006.01)
G01C 21/26 (2006.01)
(Continued)

(52) U.S. Cl.
CPC ....... *G06F 17/30867* (2013.01); *G01C 21/26* (2013.01); *G01C 21/3679* (2013.01);
(Continued)

(58) Field of Classification Search
USPC ............................................. 707/722
See application file for complete search history.

(56) References Cited

U.S. PATENT DOCUMENTS 7,503,074 B2  3/2009  Dublish et al. ............. 726/27
2010/0125569 A1*  5/2010  Nair .............. G06F 17/30864
                                                      707/722
(Continued)

FOREIGN PATENT DOCUMENTS

JP  2006-135442 A  5/2006
KR  10-2010-0116421 A  11/2010
(Continued)

OTHER PUBLICATIONS

Yu et al., Monitoring k-Nearest Neighbor Queries Over Moving Objects, international conference on data engineering, pp. 1-13, 2005.*
(Continued)

*Primary Examiner* — Cheyne D Ly
(74) *Attorney, Agent, or Firm* — Stein IP, LLC

(57) ABSTRACT

The present invention is directed to a method of calculating the results of a moving k-nearest query and safe exit locations in a road network, and more particularly to a method and apparatus that receive a request from a client terminal and provide the results of a k-nearest query, a safe zone and safe exit locations together. In the present invention, a query is processed in a server, a request for a query from a querying user and the location information of the querying user are received from an LBS, the location information of the querying user is anonymized and then the
(Continued)

query request is transferred to the server, and query results corresponding to the anonymized location information of the querying user are received from the server and then transferred to the querying user, thereby protecting the location information of the querying user.

13 Claims, 9 Drawing Sheets

(51) Int. Cl.
 H04L 29/06 (2006.01)
 G01C 21/36 (2006.01)
 G08G 1/00 (2006.01)
(52) U.S. Cl.
 CPC .... *G06F 17/3087* (2013.01); *G06F 17/30241* (2013.01); *G08G 1/20* (2013.01); *H04L 63/0421* (2013.01)

(56) References Cited

U.S. PATENT DOCUMENTS

| 2010/0185605 A1* | 7/2010 | Chu | G01C 21/3679 707/722 |
| 2010/0235340 A1* | 9/2010 | Todhunter | G06F 17/30867 707/706 |
| 2011/0098917 A1* | 4/2011 | LeBeau | G01C 21/265 701/533 |
| 2012/0173664 A1 | 7/2012 | Kammerer et al. | 709/217 |
| 2014/0090023 A1* | 3/2014 | Hu | H04W 12/06 726/4 |

FOREIGN PATENT DOCUMENTS

| KR | 10-0996910 B1 | 11/2010 |
| KR | 10-1094673 B1 | 12/2011 |
| KR | 10-2012-0078603 A | 7/2012 |
| KR | 10-1175719 B1 | 8/2012 |
| KR | 10-1287096 B1 | 7/2013 |
| KR | 10-1421671 B1 | 7/2014 |
| KR | 10-1423031 B1 | 8/2014 |

OTHER PUBLICATIONS

Bamba et al., Supporting Anonymous Location Queries in Mobile Environments with PrivacyGrid, WWW 2008, Apr. 21-25, 2008, Beijing, China, pp. 1-10.*
Cheema et al., Multi-Guarded Safe Zone: An Effective Technique to Monitor Moving Circular Range Queries, IEEE, pp. 189-200.*
Cheema et al., Influence Zone: Efficiently Processing Reverse k Nearest Neighbors Queries, ICDE Conference 2011, pp. 577-588.*
International Search Report dated Jun. 24, 2014, issued to International Application No. PCT/KR2014/001168.

* cited by examiner

Fig. 6
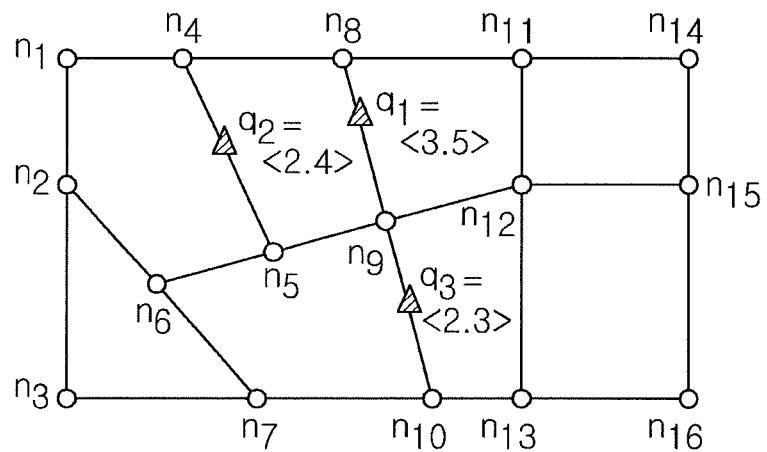
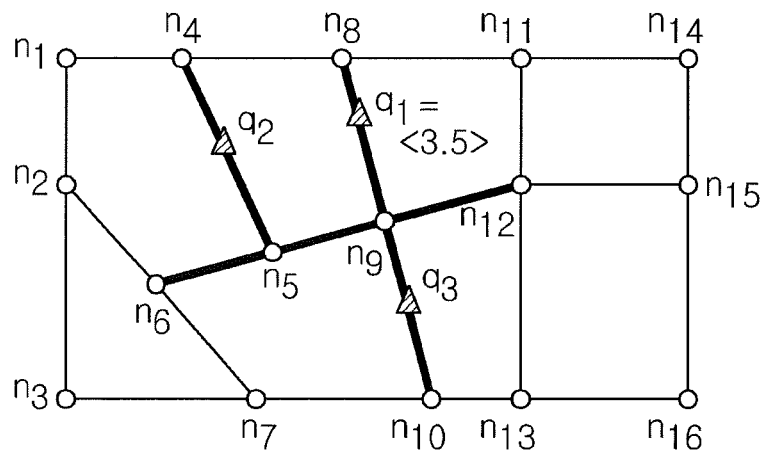

SECURE MONITORING TECHNIQUE FOR MOVING K-NEAREST QUERIES IN ROAD NETWORK

CROSS-REFERENCE TO RELATED APPLICATIONS

This application is a national stage of International Application No. PCT/KR2014/001168, filed Feb. 13, 2014, which claims the benefit of priority to Korean Application No. 10-2013-0015276, filed Feb. 13, 2013, in the Korean Intellectual Property Office, the disclosures of which are incorporated herein by reference.

TECHNICAL FIELD

The present invention relates to a safe monitoring method for a moving k-nearest query in a road network, and more particularly to a method and apparatus that receive a request for a k-nearest query from a querying user and the location of the querying user, anonymize the location of the querying user, receive the result values of the request for a k-nearest query from the anonymized querying user from a server, and transfer the result values to the querying user.

The present invention has been derived from research carried out as part of the General Researcher Support Project that has been sponsored by the Korean Ministry of Education and Science Technology and that has been conducted by the National Research Foundation of Korea and the Ajou University Industrial-Academic Cooperation Foundation [Project Management Number: 2012R1A1A2043422; Project Name: Research into Top-k Query Processing Algorithm in Location-based Service with Location Security and Location Uncertainty Taken into Account].

BACKGROUND ART

With the development of mobile communication networks and location search and service technology, such as a GPS, there has recently been a growing interest in an application field that supports location-based service for mobile objects. The location-based service for mobile objects requires k-nearest neighbor queries for efficiently searching for the location information of a mobile object and a static object, such as a gas station.

A database in which the information of road networks, the information of mobile objects, and the information of static objects have been stored is referred to as a road network database. In such a road network database, a road network is modeled by a graph having directionality.

A single road segment corresponds to a main line of a graph, and a point at which two different road segments meet each other corresponds to a node of the graph.

Furthermore, on a road network, facilities, such as a stop, a school and a hotel, are modeled by static objects, and objects having mobility, such as a vehicle and a human, are modeled by mobile objects.

Queries that are used in a road network database include k-nearest neighbor queries, range queries, and spatial join queries.

In the existing Euclidean space, the Euclidean distance between two arbitrary objects can be calculated using only the absolute locations of the objects. However, since a mobile object can move only along a predefined road network in a road network space, the network distance between two objects cannot be calculated using only the absolute locations of the objects. In this case, the network distance between two arbitrary objects refers to the total sum of the lengths of road segments present on the shortest path between the two objects on a road network.

That is, even when absolute locations are the same, the distance varies depending on the status of a network that connects two points. Accordingly, the network distance between two arbitrary points cannot be calculated using only the absolute locations of the two points. Various methods for efficiently obtaining a network distance have been researched. Representative examples thereof include the IER technique, the INE technique, and the VN technique.

The IER technique uses the fact that a Euclidean distance is always shorter than or equal to a network distance. First, candidates are searched for based on a Euclidean distance, and an actual network distance is obtained only for these candidates. Although this technique has an advantage in that storage space overhead is low, query processing performance is also considerably low because many trials and errors are undergone.

Furthermore, the INE technique searches for the presence of a static object while sequentially extending a road segment from a query point. Although this technique has the advantage of low storage space overhead like the IER technique, query processing performance is not sufficient because a plurality of disk accesses is required. The VN technique segments an overall network space into sets of cells based on points at which the distance between each static object and another adjacent static object is equal. For effective query processing, the distances among all static objects, nodes and cell boundary lines within each cell are pre-computed.

The VN technique has excellent query processing performance, but has the disadvantage of excessively high storage space overhead, compared to the IER technique and the INE technique.

Meanwhile, most current location-based services (LBS) for a wireless terminal use a method of determining the single location of a user and providing notification of the location. Furthermore, most multilateral LBS indicate the current location of a corresponding party, and application-type services using the multilateral LBS use a method of text exchange between parties.

In connection with a method of providing notification of the location information of a user in such LBS, the location information of a user, which is the important privacy information of an individual person, must be treated as information that is prohibited from becoming known to other people without the permission of the corresponding person. However, most LBS have a problem in that such a privacy issue is neglected for the sake of user convenience or benefit.

An example of conventional technology related to a method of protecting the location information of a user is disclosed in Korean Patent No. 10-1175719 entitled "Multilateral Location Information Sharing System using Wireless Terminal and GPS." This conventional technology was devised with the purpose of preventing risk attributable to location tracking, which may be misused for malicious purposes, by means of a system that can clearly identify a receiver and then permit the use of location information via a security authentication mechanism for a counterpart during location information exchange with a third party, thereby limiting and controlling the usage of the location information to the authentication of a counterpart and specific purposes and uses.

According to this preceding technology, the location information of each user is transferred to a counterpart via a GPS under the permission of the user. Accordingly, problems arise in that there is the risk of tracking the information of a user and also the costs of communication between a user and a server increase.

Therefore, there is a rising demand for an LBS protocol that can be easily combined with an algorithm that can effectively limit the range of disclosure of location information, i.e., the private information of a user, and that can also reduce the computational load of an LBS server.

DISCLOSURE

Technical Problem

Accordingly, the present invention has been devised in order to overcome the above-described problems of the conventional art. A conventional security enhancement method in the field of location-based services has been developed to a form in which the authority to access location information is provided to a counterpart who receives the location information through a complicated security authentication procedure. However, according to this method, a location-based server becomes aware of the current location of a user as a result.

Accordingly, an object of the present invention is to protect the location information of a user in such a manner that during the processing of a query, an Enhanced Location Anonymizer (ELA) server that directly determines the location information of the user anonymizes the location information of the user and transfers the anonymized location information of the user to a Location Based Service (LBS) server and then the LBS server transfers query results to the ELA server based on the anonymized location information of the user.

That is, an object of the present invention is to prevent the LBS server from directly becoming aware of the location of the querying user in order to more effectively protect the private information of the querying user.

In this case, when the location of the querying user is anonymized and then transferred to the LBS server, the computational load of the LBS server may be excessively increased. Accordingly, another object of the present invention is to define effective query results for the anonymized location of the querying user so that the computational load of the LBS server can be reduced to an appropriate level. Furthermore, still another object of the present invention is to reduce the computational costs of the LBS server and also reduce the costs of communication between the querying user (client) and the LBS server.

Technical Solution

In order to accomplish the above objects, according to an embodiment of the present invention, there is provided an apparatus for providing the safe results of a k-nearest query, including: a location reception unit configured to receive a request for a k-nearest query about at least one object from a querying user and also receive the location of the querying user, an anonymization unit configured to generate an anonymized location region by anonymizing the location of the querying user, a query request transfer unit configured to transfer the anonymized location region and the request for a k-nearest query to a server; a query result reception unit configured to receive the results of the k-nearest query, calculated in accordance with the anonymized location region, from the server; a query result calculation unit configured to calculate the results of a k-nearest query about the location of the querying user using the results of the k-nearest query calculated in accordance with the anonymized location region and received from the server; and a query result transfer unit configured to transfer the results of the k-nearest query about the location of the querying user to the querying user.

In this case, according to an embodiment of the present invention, the query result calculation unit may generate information about a safe zone that has the results of a k-nearest query identical to the former results of the k-nearest query.

Furthermore, the query result calculation unit may include a candidate region segmentation unit configured to segment the anonymized location region into one or more candidate regions based on the results of the k-nearest query, and a safe zone selection unit configured to select a candidate region, in which the querying user is located, as the safe zone.

In this case, the candidate region segmentation unit may include: a node query result calculation unit configured to calculate the results of a k-nearest query at nodes within the anonymized location region; a boundary point location calculation unit configured to determine whether a boundary point at which the results of the k-nearest query change is present on each road within the anonymized location region by comparing the results of the k-nearest query at the nodes, and to calculate the locations of boundary points on roads on which the boundary points have been determined to be present; and a candidate region identification unit configured to identify the candidate regions based on the locations of the boundary points.

In this case, according to an embodiment of the present invention, the apparatus for providing the safe results of a k-nearest query may determine whether the querying user is located within the safe zone, and may determine whether the querying user is located within the anonymized location region if the querying user is not located within the safe zone. If the location of the querying user is located within the anonymized region, the apparatus for providing the safe results of a k-nearest query may recalculate the results of a k-nearest query about the location of the querying user using the results of the k-nearest query calculated in accordance with the anonymized location region and previously received from the server. In this case, the apparatus for providing the safe results of a k-nearest query according to the present invention may provide the results of the k-nearest query about the current location of the querying user through its own computation without needs for the LBS server to recalculate the results of a query and to re-receive the results from the LBS server. Accordingly, the communication load of the LBS server can be reduced, and the computation load of the LBS server can be also reduced.

According to an embodiment of the present invention, there is provided a method of providing the safe results of a k-nearest query, including: receiving a request for a k-nearest query about at least one object from a querying user, and also receiving the location of the querying user; generating an anonymized location region by anonymizing the location of the querying user; transferring the anonymized location region and the request for a k-nearest query to a server; receiving the results of the k-nearest query, calculated in accordance with the anonymized location region, from the server; calculating the results of a k-nearest query about the location of the querying user using the results of the k-nearest query calculated in accordance with the anonymized location region and received from the server; and transferring the results of the k-nearest query about the location of the querying user to the querying user.

Advantageous Effects

In the present invention, a request for a query from a querying user and the location information of the querying user are received from an LBS, the location information of the querying user is anonymized and then the query request is transferred to a server, and query results corresponding to the anonymized location information of the querying user are received from the server and then transferred to the querying user, thereby eliminating the risk of the tracking of the location of the querying user.

Furthermore, a k-nearest query is requested from the server only when the querying user has departed from the safe zone, and thus the advantage of reducing the costs of communication between the querying user and server can be achieved. Furthermore, the number of communications and the amount of communication data between the querying user and the server are reduced, and thus the load of a network can be reduced and influence on the communication of other users can be minimized.

Furthermore, an anonymized location region may be set to include the locations of a plurality of querying users, and the LBS server may be requested to process a k-nearest query about the anonymized location region. In this case, the k-nearest query about the plurality of querying users can be calculated and provided using processing results received from the LBS server provision, and thus the load of communication between the LBS server and the querying user or (an anonymizer) can be reduced.

Moreover, an anonymized location region may function as a type of extended safe zone including a plurality of safe zones. Accordingly, when a querying user has departed from a safe zone but is still located within the anonymized location region, the anonymizer/the apparatus for providing safe query results itself may perform recalculation and provide accurate query results for the current location of the querying user. In this case, the recalculation operation of the LBS server and recommunication with the LBS server are not required, and thus the computation and communication loads of the LBS server can be reduced.

DESCRIPTION OF DRAWINGS

FIG. 6 is a view showing the conceptual content of an anonymized location region according to an embodiment of the present invention;

BEST MODE

Figure 1:
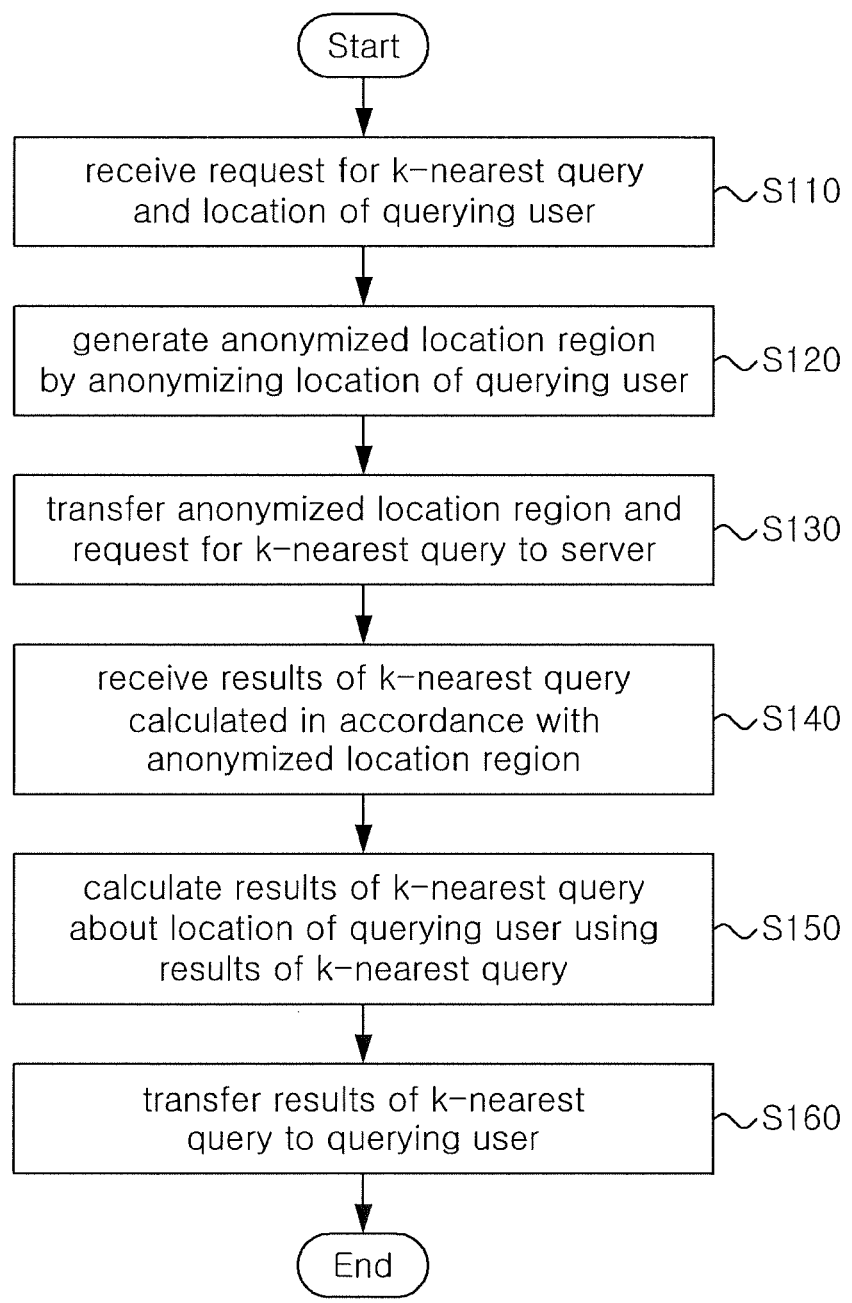
FIG. 1 is an operation flowchart showing a method for providing the safe results of a k-nearest query according to an embodiment of the present invention.

In order to accomplish the above objects, according to an embodiment of the present invention, there is provided an apparatus for providing the safe results of a k-nearest query, including: a location reception unit configured to receive a request for a k-nearest query about at least one object from a querying user and also receive the location of the querying user; an anonymization unit configured to generate an anonymized location region by anonymizing the location of the querying user; a query request transfer unit configured to transfer the anonymized location region and the request for a k-nearest query to a server; a query result reception unit configured to receive the results of the k-nearest query, calculated in accordance with the anonymized location region, from the server; a query result calculation unit configured to calculate the results of a k-nearest query about the location of the querying user using the results of the k-nearest query calculated in accordance with the anonymized location region and received from the server; and a query result transfer unit configured to transfer the results of the k-nearest query about the location of the querying user to the querying user.

In this case, according to an embodiment of the present invention, the query result calculation unit may generate information about a safe zone that has the results of a k-nearest query identical to the former results of the k-nearest query.

Furthermore, the query result calculation unit may include a candidate region segmentation unit configured to segment the anonymized location region into one or more candidate regions based on the results of the k-nearest query, and a safe zone selection unit configured to select a candidate region, in which the querying user is located, as the safe zone.

In this case, the candidate region segmentation unit may include: a node query result calculation unit configured to calculate the results of a k-nearest query at nodes within the anonymized location region; a boundary point location calculation unit configured to determine whether a boundary point at which the results of the k-nearest query change is present on each road within the anonymized location region by comparing the results of the k-nearest query at the nodes, and to calculate the locations of boundary points on roads on which the boundary points have been determined to be present; and a candidate region identification unit configured to identify the candidate region based on the locations of the boundary points.

In this case, according to an embodiment of the present invention, the apparatus for providing the safe results of a k-nearest query may determine whether the querying user is located within the safe zone, and may determine whether the querying user is located within the anonymized location region if the querying user is not located within the safe zone. If the location of the querying user is located within the anonymized region, the apparatus for providing the safe results of a k-nearest query may recalculate the results of a k-nearest query about the location of the querying user using the results of the k-nearest query calculated in accordance with the anonymized location region and previously received from the server. In this case, the apparatus for providing the safe results of a k-nearest query according to the present invention may provide the results of the k-nearest query about the current location of the querying user through its own computation without needs for the LBS server to recalculate the results of a query and to re-receive the results from the LBS server. Accordingly, the communication load of the LBS server can be reduced, and the computation load of the LBS server can be also reduced.

According to an embodiment of the present invention, there is provided a method of providing the safe results of a k-nearest query, including: receiving a request for a k-nearest query about at least one object from a querying user, and also receiving the location of the querying user; generating an anonymized location region by anonymizing the location of the querying user; transferring the anonymized location region and the request for a k-nearest query to a server; receiving the results of the k-nearest query, calculated in accordance with the anonymized location region, from the server; calculating the results of a k-nearest query about the location of the querying user using the results of the k-nearest query calculated in accordance with the anonymized location region and received from the server; and transferring the results of the k-nearest query about the location of the querying user to the querying user.

MODE FOR INVENTION

The above and other objects and features of the present invention will be apparent from the following description of embodiments taken in conjunction with the accompanying drawings.

Preferred embodiments of the present invention will be described in detail with reference to the accompanying drawings. In the following description of the present invention, if it is determined that detailed descriptions of related well-known configurations or functions may make the gist of the present invention obvious, the detailed descriptions will be omitted.

However, the present invention is not restricted or limited to the embodiments. The same reference symbols presented throughout the drawings denotes the same elements.

FIG. 1 is an operation flowchart of a method for providing the safe results of a k-nearest query according to an embodiment of the present invention.

In the method for providing the safe results of a k-nearest query, first, a request for a k-nearest query about at least one object from a querying user and the location of the querying user are received at step S110. Thereafter, an anonymized location region is generated by anonymizing the location of the querying user at step S120. In this case, an anonymized location region including the location of at least one querying user may be generated. Furthermore, an anonymized location region including a plurality of roads and a plurality of nodes that are adjacent to the location of the querying user may be generated.

Thereafter, the anonymized location region and the request for a k-nearest query are transferred to a server at step S130, and the results of the k-nearest query calculated in accordance with the anonymized location region are received from the server at step S140. In this case, the results of a k-nearest query about the end nodes of the anonymized location region may be received. Furthermore, the location information of objects that are located within the anonymized location region and also correspond to the request for the k-nearest query may be additionally received. In this case, the objects corresponding to the request for the k-nearest query are objects corresponding to the query of the querying user, and refer to a gas station, a restaurant, etc.

Thereafter, the results of the k-nearest query about the location of the querying user are calculated using the results of the k-nearest query calculated in accordance with the anonymized location region and received from the server at step S150. In this case, information about a safe zone having the results of a k-nearest query identical to the results of the k-nearest query calculated for the location of the querying user may be also generated. Thereafter, the results of the k-nearest query about the location of the querying user are transferred to the querying user at step S160. In this case, the information about a safe zone having the results of a k-nearest query identical to the results of the k-nearest query calculated for the location of the querying user, as well as the results of the k-nearest query about the location of the querying user, may be transferred to the querying user.

Step S150 of calculating the results of the k-nearest query about the location of the querying user using the results of the k-nearest query calculated in accordance with the anonymized location region is performed as follows:

The results of the k-nearest query corresponding to the anonymized location region, which are calculated by and received from the LBS server, include query results at the boundary points (end points) of the anonymized location region and the location information of objects within the anonymized location region. In this case, at step S150, k objects nearest to the location of the querying user may be recalculated using objects, i.e., query results at the boundary points of the anonymized location region, and the objects within the anonymized location region. It is a fact known to those skilled in the art that the k objects nearest to the location of the querying user can be obtained without fail by using objects, i.e., query results at the boundary points of the anonymized location region, and the objects within the anonymized location region.

In this case, the safe results of a k-nearest query corresponds to a security concept based on the fact that the location region of a querying user is anonymized, and the safe zone corresponds to a concept (a region in which query results are equally maintained at a current location) that is generated for the sake of the convenience of a querying user based on the effect of reducing the number and costs of communications between the querying user and the server.

Figure 5:
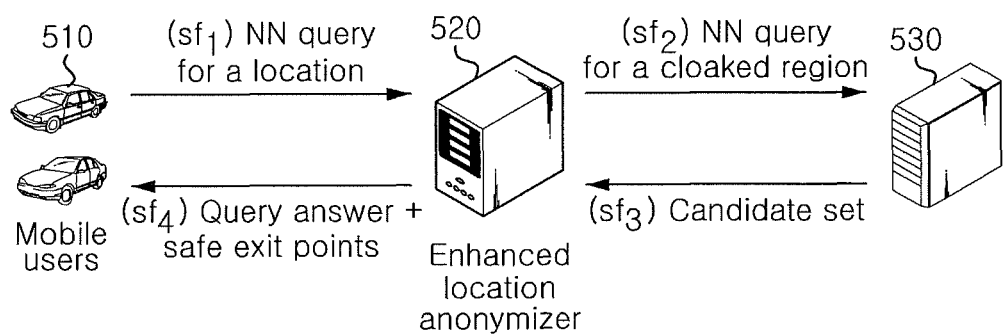
FIG. 5 is a view showing a system for providing the safe results of the k-nearest query according to an embodiment of the present invention.

The method for performing the safe processing of a k-nearest query and providing the safe results of a k-nearest query, which is shown in FIG. 1, is not necessarily performed at each time period. As shown in FIG. 5, an Enhanced Location Anonymizer (ELA) server 520 provides the processing results of a query and information about a safe zone (a region in which current query results are equally maintained) to the querying user. In this case, the notification of the location of the querying user may be provided to the ELA/anonymizer server 520 at each predetermined period or when there is a change in the location of the querying user. In this case, in another embodiment of the present invention, a querying user may request a location query from the ELA/anonymizer server 520 when his or her location has departed from a safe zone. In this embodiment, a querying user may request a query while providing location information at first, and, thereafter, may determine whether his or her location has departed from the safe zone by himself or herself and then request a query while providing location information only when his or her location has departed from the safe zone.

Figure 2:
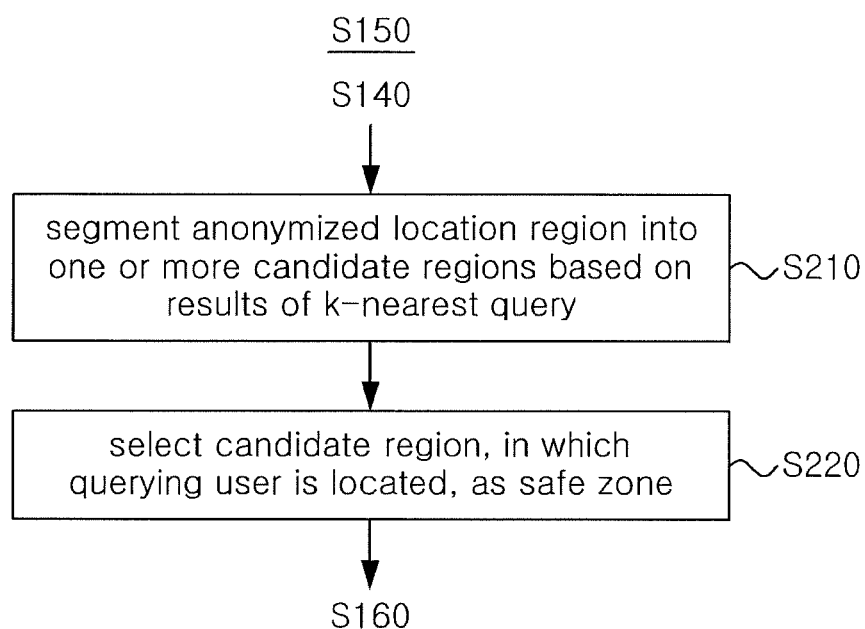
FIG. 2 is an operation flowchart showing an embodiment of one step of FIG. 1—the step of calculating query results for the location of a querying user from query results for an anonymized location region—in greater detail.

FIG. 2 is an operation flowchart of a method of selecting a safe zone in which a querying user is located according to an embodiment of the present invention.

In order to generate information about a safe zone for a querying user using the results of a k-nearest query about the anonymized location region of the querying user when the results of the k-nearest query about the location of the querying user is calculated at step S150, the anonymized location region of the querying user may be segmented into one or more candidate regions based on the results of the k-nearest query received from the server at step S210.

Thereafter, a candidate region in which the querying user is located may be selected as the safe zone from the one or more candidate regions obtained based on the results of the k-nearest query within the anonymized location region at step S220.

Figure 3:
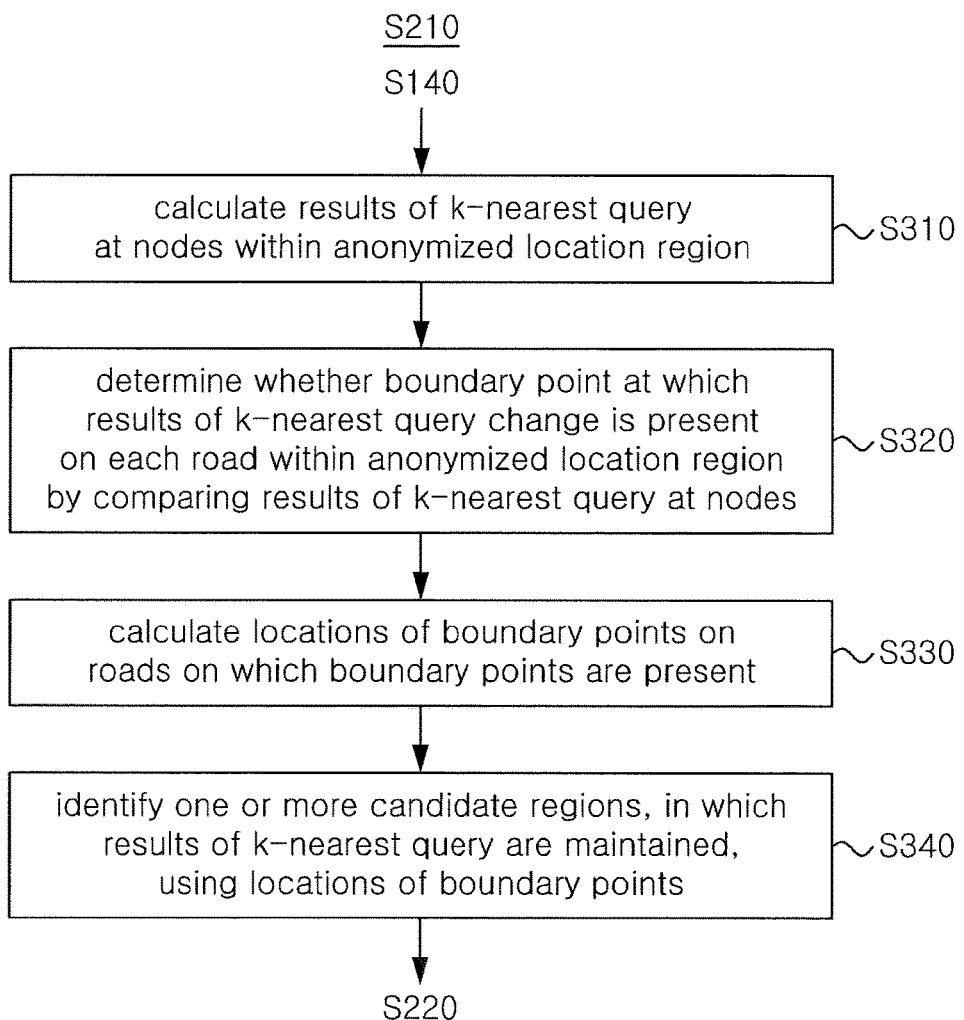
FIG. 3 is an operation flowchart showing one step of FIG. 2—the step of segmenting an anonymized location region into candidate regions for a safe zone—in greater detail.

FIG. 3 is an operation flowchart showing the step of segmenting an anonymized location region into one or more candidate regions, which is shown in FIG. 2, in detail.

When the anonymized location region of a querying user is segmented into one or more candidate regions based on the results of a k-nearest query received from the server at step S210, first, the results of the k-nearest query are calculated at nodes (intersections between road segments) within the anonymized location region of the querying user at step S310.

Thereafter, whether a boundary point at which the results of the k-nearest query change is present on each road segment within the anonymized location region querying user is determined by comparing the results of the k-nearest query at the nodes at step S320.

Thereafter, the locations of boundary points are calculated on road segments on which the boundary points, at which the results of the k-nearest query change, have been determined to be present at step S330. In this case, the boundary points may be equivalently represented as outer points or the locations of one or more candidate region exits.

Thereafter, one or more candidate regions are identified on the roads, on which the boundary points at which the results of the k-nearest query change have been determined to be present, based on the locations of the boundary points at step S340.

Figure 4:
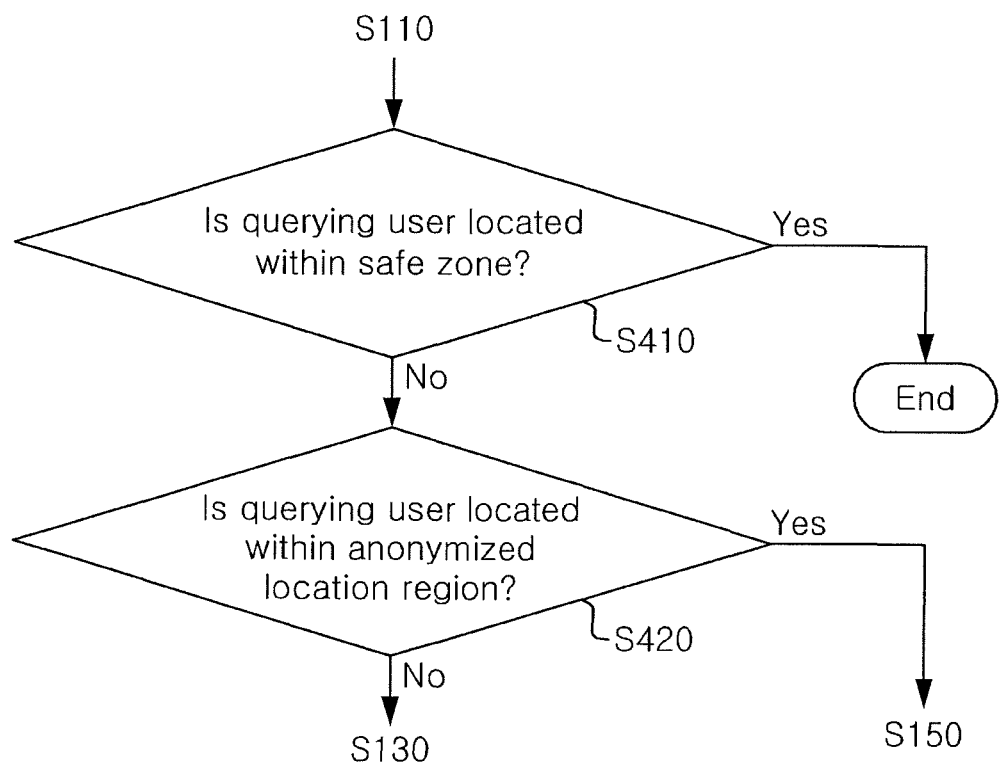
FIG. 4 is an operation flowchart of a method of providing the results of a k-nearest query based on the location of a querying user according to an embodiment of the present invention.

FIG. 4 is an operation flowchart of a method of providing the results of a k-nearest query based on the location of a querying user according to an embodiment of the present invention.

A request for a k-nearest query from the querying user and the location of a querying user are newly received at step S110. When an anonymized location region is generated by anonymizing the location of the querying user at step S120, whether the location of the querying user is located within a safe zone may be also determined at step S410. In this case, if the querying user is located within the safe zone, the existing results of a k-nearest query are maintained without change.

If the querying user is not located within safe zone, whether the querying user is located within the anonymized location region is determined at step S420. Furthermore, when the querying user has departed from the safe zone but still remains with the anonymized region, query results for the current location of the querying user may be calculated using the results of the k-nearest query, calculated in accordance with the anonymized location region of the user previously received from the server, without requesting the results of a k-nearest query from the server (LBS server).

In this case, if the querying user is not located within the anonymized location region, the anonymized location region of the querying user and the request for a k-nearest query are transferred to the server at step S130.

FIG. 4 is illustrated based on an embodiment in which a querying user continuously notifies the ELA server 520 of his or her location periodically or under a predetermined condition. However, the embodiment of the present invention does not necessarily have the configuration of FIG. 4. For example, according to another embodiment of the present invention, a querying user receives information about a safe zone from the ELA server 520, and thus the querying user may determine whether his or her location has departed from a safe zone. In this case, the querying user requests a query while providing his or her location when his or her location has departed from the safe zone after a first query, and thus step S410 may not be performed in the ELA server 520. In such an embodiment, since a separate query request is not made by the querying user when the location of the querying user remains within the safe zone, the ELA server 520 or LBS server 530 may not also perform any operation.

FIG. 5 is a view showing a system for providing the safe results of the k-nearest query according to an embodiment of the present invention.

The system for providing the safe results of the k-nearest query includes a querying user 510, an ELA server 520, and an LBS server 530.

In the system for providing the safe results of the k-nearest query, the ELA server 520 receives the location information of the querying user 510, and the LBS server 530 stores information about objects. The ELA (enhanced location anonymizer) server 520 anonymizes the location of the querying user 510, and transmits the anonymized location of the querying user 510 to the LBS (location-based service) server 530 in the state in which an accurate location cannot be determined.

In this case, when the querying user 510 transmits the request for the k-nearest query to the ELA server 520, the querying user 510 may transmit the request for the k-nearest query to the ELA server 520 with the location information of the querying user 510 and private information protection requirements included in the request.

The ELA server 520 anonymizes a location region, including the location of the querying user 510, using the request for the k-nearest query, the location information of the querying user 510 and the private information protection requirements received from the querying user 510.

Thereafter, the anonymized location region of the querying user 510 and the request for the k-nearest query information are transferred from the ELA server 520 to the LBS server 530. The LBS server 530 calculates the results of the k-nearest query in accordance with the anonymized location region of the querying user 510. In this case, the results of the k-nearest query are obtained by calculating the results of the k-nearest query for all regions within the anonymized location region of the querying user 510, and a group of candidates for the results of the k-nearest query for the most accurate answer to the request for the k-nearest query are formed among the results of the k-nearest query for all the regions within the anonymized location region querying user 510.

Thereafter, the group of candidates for the results of the k-nearest query are transferred to the ELA server 520, and the ELA server 520 may calculate a safe zone, in which the results of the k-nearest query are guaranteed, and the exit points of the safe zone using the anonymized location information of the querying user 510 and the results of the k-nearest query received from the LBS server 530.

Thereafter, the ELA server 520 transfers the results of the k-nearest query to the querying user 510, and may transfer the exit points of the safe zone, in which the results of the k-nearest query are guaranteed, along with the results of the k-nearest query.

Accordingly, the results of the k-nearest query, received from the ELA server 520 in response to the request for the k-nearest query are maintained before the querying user 510 reaches the exit points of the safe zone.

The ELA server 520 periodically receives the location information of the querying user 510, determines whether the location of the querying user 510 is located within the anonymized region, and maintains the results of the k-nearest query if the querying user 510 is located within the anonymized region.

If the querying user 510 reaches or has passed through the exit points of the safe zone, the ELA server 520 determines whether the location of the querying user 510 is located within the anonymized region. If the location of the querying user 510 is located within the anonymized region, the ELA server 520 recalculates the results of the k-nearest query most accurate for the request for the k-nearest query from the querying user 510 in the group of candidates for the results of the k-nearest query received from the LBS server 530, and transfers the recalculated results of the k-nearest query to the querying user 510. In this case, a safe zone, in which the recalculated results of the k-nearest query are maintained, and the exit points of the safe zone may be calculated, and the recalculated exit points of the safe zone may be also transferred to the querying user 510.

Alternatively, in the case where the querying user 510 reaches or has passed through the exit points of the safe zone and the ELA server 520 determines whether the location of the querying user 510 is located within the anonymized region, if the querying user 510 is not located within the anonymized region, the ELA server 520 re-receives information about a request for a k-nearest query and location information from the querying user 510, and anonymizes the re-received location information of the querying user 510.

Thereafter, the ELA server 520 transfers the anonymized location region of the querying user 510 and the request for the k-nearest query information to the LBS server 530, and the LBS server 530 recalculates the results of the k-nearest query in accordance with the anonymized location region of the querying user 510. In this case, the results of the k-nearest query are obtained by calculating the results of the k-nearest query for all regions within the anonymized location region of the querying user 510, and a group of candidates for the results of the k-nearest query for the most accurate answer to the request for the k-nearest query are formed among the results of the k-nearest query for all the regions within the anonymized location region querying user 510.

Thereafter, the group of candidates for the results of the k-nearest query are transferred to the ELA server 520, and the ELA server 520 may calculate a safe zone, in which the results of the k-nearest query are guaranteed, and the exit points of the safe zone using the anonymized location information of the querying user 510 and the results of the k-nearest query received from the LBS server 530.

Thereafter, the ELA server 520 transfers the results of the k-nearest query to the querying user 510. In this case, the ELA server 520 may transfer the exit points of the safe zone, in which the results of the k-nearest query are guaranteed, along with the results of the k-nearest query.

FIG. 6 is a view showing the conceptual content of an anonymized location region according to an embodiment of the present invention.

In FIG. 6, $q_1$ denotes a querying user 510. Furthermore, in the drawing, symbols $n_1$ to $n_{16}$ denote nodes, i.e., intersections between road segments, and anonymized regions are represented by thick line segments.

The process of anonymizing the location of a querying user may include a condition in which anonymization is performed to include a plurality of user locations, or a condition in which anonymization is performed to include a plurality of nodes and a plurality of road segments.

Furthermore, querying users may present different anonymization conditions.

For example, a querying user $q_1$ presents anonymization condition <3,5>. This may be construed as a request to perform anonymization to include 3 or more users and 5 or more road segments, for ease of description.

Furthermore, a querying user $q_2$ may request anonymization to be perform to include 2 or more users and 4 or more road segments via anonymization condition <2,4>.

The apparatus for providing the safe results of query according to the present invention, i.e., the ELA server 520, may calculate an anonymized region appropriate for each anonymization request for each querying user, and may make a query to the LBS server 530.

Meanwhile, according to another embodiment of the present invention, the ELA server 520 may collect anonymization requests from a plurality of querying users present at adjacent locations, and may provide a single most effective and extensive anonymized region. For example, as shown in FIG. 6, an anonymized region including at least three querying users $q_1$, $q_2$ and $q_3$, inclusive of the querying user 510 ($q_1$), and at least five segments $\{n_5 n_6, n_5 n_9, n_4 n_5, n_8 n_9, n_9 n_{10}, n_9 n_{12}\}$ satisfies not only anonymization requests from the querying user $q_1$ but also anonymization requests from the adjacent querying users $q_2$ <2,4> and $q_3$ <2,3>. Accordingly, the ELA server 520 may request a query about the single anonymized region from the LBS server, may analyze obtained query results, and may provide the results of the analysis to the three querying users $q_1$, $q_2$ and $q_3$.

Boundary points $\{n_4, n_6, n_8, n_{10}, n_{12}\}$ are the boundary points of the anonymized region for all the plurality of querying users $q_1$, $q_2$ and $q_3$.

That is, current query results on roads on which the plurality of querying users $q_1$, $q_2$ and $q_3$ are located and query results within the anonymized region are the same. Before the plurality of querying users $q_1$, $q_2$ and $q_3$ passes through the boundary points, query results identical to the current query results received from the ELA server 520 are maintained.

Thereafter, when the plurality of querying users $q_1$, $q_2$ and $q_3$ has departed or is expected to depart from the boundary points, the results of a new k-nearest query may be requested from the LBS server 530.

Figure 7:
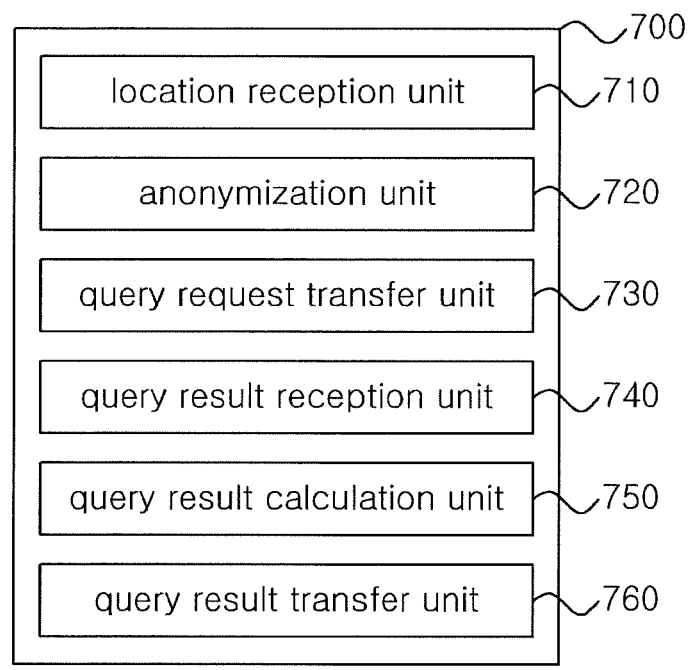
FIG. 7 is a block diagram showing the conceptual configuration of an apparatus for providing the safe results of a k-nearest query according to an embodiment of the present invention.

FIG. 7 is a block diagram showing the conceptual configuration of an apparatus for providing the safe results of a k-nearest query according to an embodiment of the present invention.

The apparatus 700 for providing the safe results of a k-nearest query includes a processor (not shown), and the processor may include: a location reception unit 710 configured to receive a request for a k-nearest query about at least one object from a querying user 510 and also receive the location of the querying user 510; an anonymization unit 720 configured to generate an anonymized location region by anonymizing the location of the querying user 510; a query request transfer unit 730 configured to transfer the anonymized location region and the request for a k-nearest query to a server; a query result reception unit 740 configured to receive the results of the k-nearest query, calculated in accordance with the anonymized location region, from the server; a query result calculation unit 750 configured to calculate the results of a k-nearest query about the location of the querying user 510 using the results of the k-nearest query calculated in accordance with the anonymized location region and received from the server; and a query result transfer unit 760 configured to transfer the results of the k-nearest query about the location of the querying user 510 to the querying user 510.

In this case, the query result reception unit 740 may receive the results of a k-nearest query about the end nodes of the anonymized location region of the querying user 510 from the LBS server 530. Furthermore, the query result reception unit 740 may receive the location information of objects located within the anonymized location region of the querying user 510. In this case, the objects, notification of the location information of which is provided, are objects corresponding to the request for the k-nearest query from the querying user 510. If the querying user 510 has requested a query about three nearest gas stations, the location information of gas stations located within the anonymized location region is transferred.

Furthermore, the query result calculation unit 750 may generate not only the results of the k-nearest query calculated for the location information of the querying user 510 but also information about a safe zone having the results of a k-nearest query identical to the former results of the k-nearest query. In this case, the query result transfer unit 760 may transfer the information about a safe zone, together with the results of the k-nearest query about the location information of the querying user 510, to the querying user 510.

Figure 8:
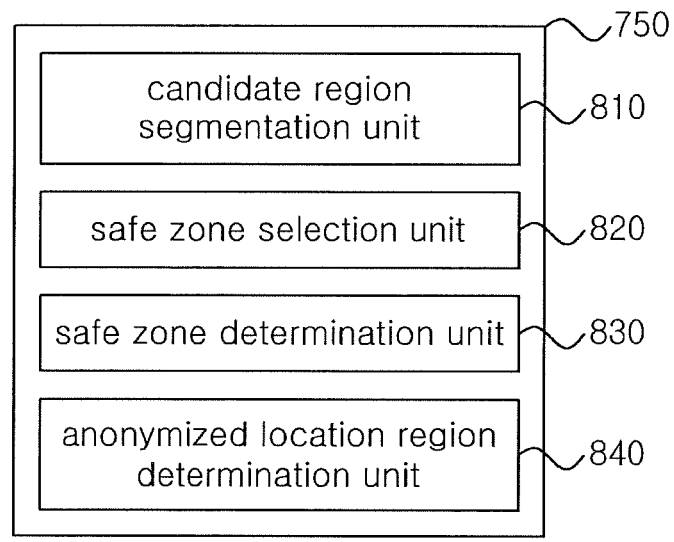
FIG. 8 is a block diagram showing the conceptual configuration of the query result calculation unit, which is one component of FIG. 7.

FIG. 8 is a block diagram showing the conceptual configuration of the query result calculation unit, which is one component of FIG. 7.

The query result calculation unit 750 includes: a candidate region segmentation unit 810 configured to segment a location region, in which the location information of the querying user 510 has been anonymized, into one or more candidate regions based on the results of the k-nearest query received from the LBS server 530; a safe zone selection unit 820 configured to select a candidate region, in which the querying user 510 is located, as the safe zone; a safe zone determination unit 830 configured to determine whether the querying user 510 is located within the safe zone; and an anonymized location region determination unit 840 configured to determine whether the querying user 510 is located within the anonymized location region.

In this case, the safe zone determination unit 830 determines whether the querying user 510 is located within the safe zone, i.e., the candidate region in which the querying user 510 is located, and continues to maintain the previous results of the k-nearest query without change if the querying user 510 is located within the safe zone. In this case, notwithstanding that the location of the querying user 510 has been changed, any action will not be actually taken in the ELA server 520 and LBS server 530.

If the querying user 510 is not located within the safe zone, the anonymized location region determination unit 840 determines whether the location of the querying user 510 is located within the anonymized region. If the location of the querying user 510 is located within the anonymized region, the safe zone selection unit 820 reselects a candidate region in which the querying user 510 is located as the safe zone based on the current location of the querying user 510. Furthermore, the query result calculation unit 750 may recalculate the results of the k-nearest query about the location of the querying user 510 using the results of the k-nearest query calculated in accordance with the anonymized location region and previously received from the LBS server 530.

In this case, if the location of the querying user 510 is not located within the anonymized region, the location information of the querying user 510 and a request for a k-nearest query are received again, this received location information of the querying user 510 is anonymized, and the anonymized location region and the request for a k-nearest query are transferred to the LBS server 530.

Figure 9:
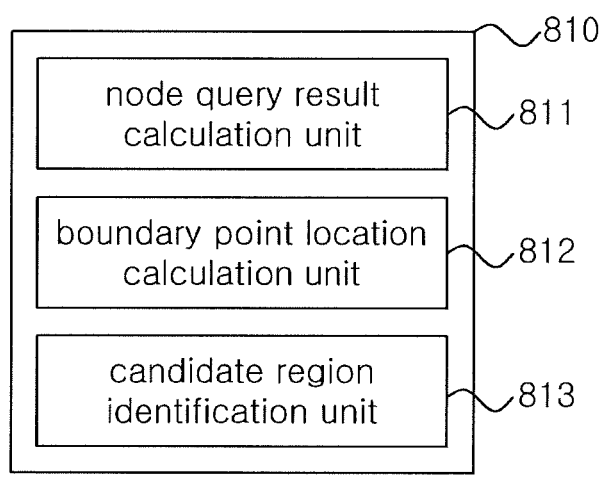
FIG. 9 is a block diagram showing the conceptual configuration of the candidate region segmentation unit, which is one component of FIG. 8.

FIG. 9 is a block diagram showing the conceptual configuration of the candidate region segmentation unit, which is one component of FIG. 8.

The candidate region segmentation unit 810 includes: a node query result calculation unit 811 configured to calculate the results of a k-nearest query at nodes within a location region in which the location region of the querying user 510 has been anonymized; a boundary point location calculation unit 812 configured to determine whether a boundary point at which the results of the k-nearest query change is present on each road within the anonymized location region by comparing the results of the k-nearest query at the nodes, and to calculate the location of boundary points on roads on which the boundary points has been determined to be present; and a candidate region identification unit 813 configured to identify one or more candidate regions based on the locations of the boundary points.

The boundary point location calculation unit 812 may calculate the locations of the boundary points on the roads, on which the boundary points have been determined to be present, by taking into account changes in distances to adjacent objects attributable to the virtual movement of the reference location of the k-nearest query.

The method for providing the safe results of a k-nearest query according to the embodiment of the present invention may be implemented in the form of program instructions that can be executed by a variety of computer means, and may be stored in a computer-readable storage medium. The computer-readable storage medium may include program instructions, a data file, and a data structure solely or in combination. The program instructions that are stored in the medium may be designed and constructed particularly for the present invention, or may be known and available to those skilled in the field of computer software. Examples of the computer-readable storage medium include magnetic media such as a hard disk, a floppy disk and a magnetic tape, optical media such as CD-ROM and a DVD, magneto-optical media such as a floptical disk, and hardware devices particularly configured to store and execute program instructions such as ROM, RAM, and flash memory. Examples of the program instructions include not only machine language code that is constructed by a compiler but also high-level language code that can be executed by a computer using an interpreter or the like. The above-described hardware components may be configured to act as one or more software modules that perform the operation of the present invention, and vice versa.

As described above, although the present invention has been described in conjunction with specific details, such as specific elements and limited embodiments and drawings, these are provided merely to help the overall understanding of the present invention. The present invention is not limited to these embodiments, and various modifications and variations can be made based on the foregoing description by those having ordinary knowledge in the art to which the present invention pertains.

Accordingly, the technical spirit of the present invention should not be defined based on only the described embodiments, and the following claims, all equivalents to the claims and equivalent modifications should be construed as falling within the scope of the spirit of the present invention.

INDUSTRIAL APPLICABILITY

The present invention is directed to a method of calculating the results of a moving k-nearest query and safe exit locations in a road network, and more particularly to a method and apparatus that receive a request from a client terminal and provide the results of a k-nearest query, a safe zone and safe exit locations together.

In the present invention, a query is processed in a server, a request for a query from a querying user and the location information of the querying user are received from an LBS, the location information of the querying user is anonymized and then the query request is transferred to the server, and query results corresponding to the anonymized location information of the querying user are received from the server and then transferred to the querying user, thereby protecting the location information of the querying user.

The invention claimed is:

1. A method of providing safe results of a k-nearest query, comprising:
   receiving a request for a k-nearest query about at least one object from a querying user, and also receiving a location of the querying user;
   generating an anonymized location region by anonymizing the location of the querying user;
   transferring the anonymized location region and the request for a k-nearest query to a server;
   receiving results of the k-nearest query, calculated in accordance with the anonymized location region, from the server;
   calculating results of a k-nearest query about the location of the querying user using the results of the k-nearest query calculated in accordance with the anonymized location region and received from the server; and
   transferring the results of the k-nearest query about the location of the querying user to the querying user,
   wherein:
   calculating the results of the k-nearest query about the location of the querying user comprises generating information about a safe zone that has results of a k-nearest query identical to the former results of the k-nearest query; and
   transferring the results of the k-nearest query about the location of the querying user to the querying user comprises transferring the information about a safe zone, together with the results of the k-nearest query about the location information of the querying user, to the querying user,
   wherein calculating the results of the k-nearest query about the location of the querying user comprises:
   segmenting the anonymized location region into one or more candidate regions based on the results of the k-nearest query; and
   selecting a candidate region, in which the querying user is located, as the safe zone,
   wherein segmenting the anonymized location region into the candidate regions comprises:
   calculating results of a k-nearest query at nodes within the anonymized location region;
   determining whether a boundary point at which the results of the k-nearest query change is present on each road within the anonymized location region by comparing the results of the k-nearest query at the nodes;
   calculating locations of boundary points on roads on which the boundary points have been determined to be present; and
   identifying the candidate regions based on the locations of the boundary points.

2. The method of claim 1, wherein generating the anonymized location region comprises generating the anonymized location region including a location of at least one querying user.

3. The method of claim 1, wherein generating the anonymized location region comprises generating the anonymized location region including a plurality of roads and a plurality of nodes that are adjacent to the location of the querying user.

4. The method of claim 1, wherein receiving the results of the k-nearest query comprises receiving results of a k-nearest query about end nodes of the anonymized location region.

5. The method of claim 1, wherein receiving the results of the k-nearest query comprises additionally receiving location information of objects that are located within the anonymized location region and also correspond to the request for a k-nearest query.

6. The method of claim 1, further comprising determining whether the querying user is located within the safe zone,
   wherein calculating the results of the k-nearest query about the location of the querying user and transferring the results of the k-nearest query about the location of the querying user to the querying user comprise, if the querying user is located within the safe zone, continuing to maintain the previous results of the k-nearest query.

7. The method of claim 1, further comprising determining whether the querying user is located within the anonymized location region,
   wherein calculating the results of the k-nearest query about the location of the querying user comprises, if the location of the querying user is located within the anonymized region, recalculating results of a k-nearest query about the location of the querying user using the results of the k-nearest query calculated in accordance with the anonymized location region and previously received from the server.

8. A computer-readable storage medium having stored thereon a program for executing the method of claim 1.

9. An apparatus for providing safe results of a k-nearest query, comprising:
   a location reception unit configured to receive a request for a k-nearest query about at least one object from a querying user and also receive a location of the querying user;
   an anonymization unit configured to generate an anonymized location region by anonymizing the location of the querying user;
   a query request transfer unit configured to transfer the anonymized location region and the request for a k-nearest query to a server;
   a query result reception unit configured to receive results of the k-nearest query, calculated in accordance with the anonymized location region, from the server;

a query result calculation unit configured to calculate results of a k-nearest query about the location of the querying user using the results of the k-nearest query calculated in accordance with the anonymized location region and received from the server; and a query result transfer unit configured to transfer the results of the k-nearest query about the location of the querying user to the querying user, wherein:

the query result calculation unit generates information about a safe zone that has results of a k-nearest query identical to the former results of the k-nearest query; and the query result transfer unit transfers the information about a safe zone, together with the results of the k-nearest query about the location information of the querying user, to the querying user, wherein the query result calculation unit comprises:

a candidate region segmentation unit configured to segment the anonymized location region into one or more candidate regions based on the results of the k-nearest query; and a safe zone selection unit configured to select a candidate region, in which the querying user is located, as the safe zone, wherein the candidate region segmentation unit comprises:

a node query result calculation unit configured to calculate results of a k-nearest query at nodes within the anonymized location region;

a boundary point location calculation unit configured to:

determine whether a boundary point at which the results of the k-nearest query change is present on each road within the anonymized location region by comparing the results of the k-nearest query at the nodes; and calculate locations of boundary points on roads on which the boundary points have been determined to be present; and a candidate region identification unit configured to identify the candidate regions based on the locations of the boundary points.

10. The apparatus of claim 9, wherein the query result reception unit receives results of a k-nearest query about end nodes of the anonymized location region.

11. The apparatus of claim 9, wherein the query result reception unit additionally receives location information of objects that are located within the anonymized location region and also correspond to the request for a k-nearest query.

12. The apparatus of claim 9, further comprising a safe zone determination unit configured to determine whether the querying user is located within the safe zone, wherein the query result calculation unit and the query result transfer unit, if the querying user is located within the safe zone, continue to maintain the previous results of the k-nearest query.

13. The apparatus of claim 9, further comprising an anonymized location region determination unit configured to determine whether the querying user is located within the anonymized location region, wherein the query result calculation unit, if the location of the querying user is located within the anonymized region, recalculates results of a k-nearest query about the location of the querying user using the results of the k-nearest query calculated in accordance with the anonymized location region and previously received from the server.

* * * * *